US012757110B2

(12) United States Patent
Balmakhtar et al.

(10) Patent No.: US 12,757,110 B2
(45) Date of Patent: Oct. 6, 2026

(54) PARALLEL PATH 5G NETWORK SLICE

(71) Applicant: T-Mobile Innovations LLC, Overland Park, KS (US)

(72) Inventors: Marouane Balmakhtar, Fairfax, VA (US); Lyle W. Paczkowski, Mission Hills, KS (US)

(73) Assignee: T-Mobile Innovations LLC

( * ) Notice: Subject to any disclaimer, the term of this patent is extended or adjusted under 35 U.S.C. 154(b) by 311 days.

(21) Appl. No.: 18/485,957

(22) Filed: Oct. 12, 2023

(65) Prior Publication Data

US 2025/0126551 A1 Apr. 17, 2025

(51) Int. Cl.
*H04W 48/18* (2009.01)
*H04W 76/10* (2018.01)

(52) U.S. Cl.
CPC .......... *H04W 48/18* (2013.01); *H04W 76/10* (2018.02)

(58) Field of Classification Search
CPC .............................. H04W 48/18; H04W 76/10
USPC ........................................................ 455/422.1
See application file for complete search history.

(56) References Cited

U.S. PATENT DOCUMENTS

2023/0109814 A1* 4/2023 Lee ...................... H04W 48/18 455/434

* cited by examiner

*Primary Examiner* — Huy C Ho

(57) ABSTRACT

In some examples, a method includes establishing via a first communication device, a communication session in a network slice through a first network attachment type. The method also includes transitioning through a radio access network (RAN) from the first network attachment type to a second network attachment type. The method also includes continuing, via a second communication device, the communication session in the network slice through the second network attachment type simultaneously with the communication session in the network slice through the first network attachment type.

19 Claims, 5 Drawing Sheets

PARALLEL PATH 5G NETWORK SLICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Various environments have proprietary, closed, or other industrial, scientific, and medical (ISM) band systems which vary from licensed telecommunications spectrum. However, in certain application environments it may be useful to maintain a relationship or connection between the ISM band systems and licensed spectrum systems.

SUMMARY

In some examples, a method includes establishing via a first communication device, a communication session in a network slice through a first network attachment type. The method also includes transitioning through a radio access network (RAN) from the first network attachment type to a second network attachment type. The method also includes continuing, via a second communication device, the communication session in the network slice through the second network attachment type simultaneously with the communication session in the network slice through the first network attachment type.

In some examples, a communication system includes a 3rd Generation Partnership Project (3GPP) network attachment interface. The communication system also includes a non-3GPP Inter-Working Function (N3IWF) network attachment interface. The communication system also includes a core network including a non-transitory memory including instructions for implementing a telemetry coordination manager. The telemetry coordination manager configured to bind the 3GPP network attachment interface and the N3IWF network attachment interface to a same network slice of the core network.

In some examples, an application server operates in a network slice of a mobile network operator core network. The application server is configured to receive, via the network slice through the core network, first data received by the core network at a first network attachment interface, and receive, via the network slice through the core network, second data received by the core network at a second network attachment interface.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
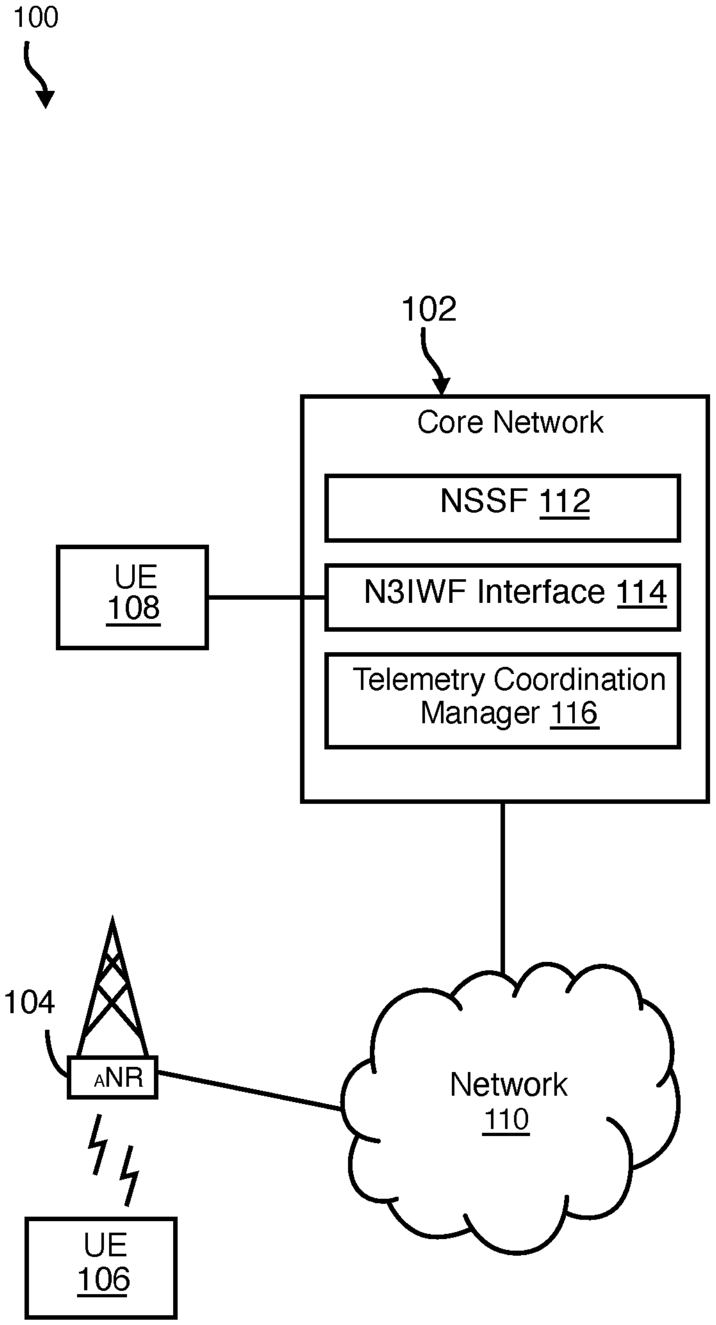
FIG. 1 is a block diagram of a communication system, in accordance with various examples.

Although example implementations of one or more embodiments are shown below, the disclosed systems and methods may be implemented using any number of techniques, whether currently known or not yet in existence. The disclosure should in no way be limited to the example implementations, drawings, and techniques shown below, but may be modified within the scope of the appended claims along with their full scope of equivalents.

Telemetry systems collect measurements or other data at remote points and transmit the data to receiving equipment for monitoring. Such systems may be useful in asset tracking, inventory management, fleet management, or the like. However, challenges may arise in integration between a static system, such as in a store, warehouse, garage, equipment yard, or the like, and a moving system, such as when assets move between static systems or from a static system to another location which does not include a static telemetry system.

For example, a mobile network operator (MNO) may provide telecommunication service to a user for connectivity of the moving system. In some examples, this connectivity is in a 5G network via a network slice dedicated to that particular user. For example, XYZ Corp., may be allocated or provisioned a network slice, which provides dedicated functionality to XYZ Corp., such as telecommunication connectivity for semi-trailer trucks associated with XYZ Corp., as they move from place to place. However, XYZ Corp., may also have associated warehouse facilities or partner facilities in which inventory is tracked through ISM band systems which are not maintained by the MNO and therefore not a part of the allocated network slice. This may create challenges in end-to-end tracking of assets by XYZ Corp.

To mitigate the above challenges, the MNO may implement changes in a network core maintained and operated by the telecommunication provider. For example, via a Non-3GPPP Inter-Working Function (N3IWF), the MNO may interface with the ISM band system to facilitate a flow of data between the network core and the ISM band system. In some conventional network slicing techniques, a network slice has a single entry point into the core network though a radio access network (RAN) or a user plane function (UPF). The MNO may bind or otherwise associate multiple entry points into the network slice to create a relationship between the entry points and UE devices (such as a semi-trailer truck and a warehouse) that communicate with the network core via the entry points. In this way, the MNO may join or otherwise associate the ISM band system with the network slice provided to the user. In some examples, the network core, via the network slice collects information about activities of, or otherwise associated with or related to, the user equipment coupled to the network core and network slice via the multiple entry points. The network slice may provide this information to an external application function, such as for analysis, tracking, or other functions.

In other examples, robotic devices or other machines may communicate with various networks. For example, at a first time, the device may operate according to a non-3GPP communication type (e.g., via something other than a RAN) and at a second time the device may operate according to a 3GPP communication type (e.g., via a RAN). As described above, challenges can arise in associating both the 3GPP communication type and the non-3GPP communication type with a same slice in the core network of the MNO.

In some examples, the MNO provides a telemetry coordination manager. The telemetry coordination manager may reside in the core network of the MNO, such as within a Network Slice Selection Function (NSSF) of the core network (e.g., as a module of the NSSF), or as a peer or parallel element to the NSSF in a network resource management portion of a control plane of the core network 102. In some examples, the telemetry coordination manager binds two separate entry points into the core (e.g., a N3IWF and a RAN) together creating two parallel paths belonging to the same network slice in the core network.

Turning now to FIG. 1, a communication system 100 is described, in accordance with various examples. In an example, the communication system 100 includes a core network 102, a cell site 104, UE 106, UE 108, and a network 110. The core network 102 may be part of a carrier network, both of which may be owned and operated by a MNO. The UE 106 may be connected to the core network 102 and the carrier network via the cell site 104. The UE 108 may be connected to the core network 102 and the carrier network via the cell site 104.

The cell site 104 may provide the UE 106 and the UE 108 with a wireless communication link to the core network 102 and/or network 110 according to a 5G, a long-term evolution (LTE), a code division multiple access (CDMA), a global system for mobile communications (GSM) wireless telecommunication protocol, or any other RAN-based communication protocol. The network 110 may be one or more private networks, one or more public networks, the Internet, or a combination thereof. While FIG. 1 shows the core network 102 as being separate from the network 110, in some examples, at least a portion of the core network 102 may be part of the network 110. Although not shown in FIG. 1, in some examples, the communication system 100 includes multiple cell sites 104 and different respective ones of the multiple cell sites 104 provide the UE 106 and/or the UE 108 with the wireless communication link to the core network 102 and/or network 110 at different times.

The UE 106 may be a cell phone, a mobile phone, a smart phone, a personal digital assistant (PDA), an Internet of things (IoT) device, a wearable computer, a headset computer, a laptop computer, a tablet computer, or a notebook computer. In some examples, the UE 106 may be a moving asset, such as a semi-trailer truck, boat, airplane, or other vehicle. In other examples, the UE 106 may be a computing device implemented in a moving asset, such as a device having modem or cellular functionality compatible with the core network of the MNO or RAN of the MNO, or a device lacking modem functionality but coupled to a second device which includes modem functionality.

The UE 108 may be a cell phone, a mobile phone, a smart phone, a PDA, an IoT device, a wearable computer, a headset computer, a laptop computer, a tablet computer, or a notebook computer. In some examples, the UE 108 may be a static asset, such as a ISM band reader or interrogator, a server, a sensor, or the like. In some examples, the UE 108 may include suitable hardware and functionality for communicating with the core network 102 via an access network other than the cell site 104.

The carrier network may be a network including a RAN and a core network 102. The RAN may include the access network containing the radio elements of a carrier network, and the core network 110 may include the elements that manage the subscriber information, call setup and routing, and related system supports. In some examples, the system 100 comprises elements for establishing, maintaining, managing, or otherwise implementing network slicing in any combination of the core network 110 and/or the carrier network. In an embodiment, the core network 102 may be an evolved packet core (EPC) core network. The core network 102 may be configured to implement a 5G, a LTE, a CDMA, or a GSM wireless telecommunication protocol. In one embodiment, the core network 102 may be a 3rd Generation Partnership Project (3GPP) Evolved Packet System (EPS).

As shown in FIG. 1, the core network 102 may include a NSSF 112, a N3IWF interface 114, and a telemetry coordination manager 116. In various examples, the core network 102 includes other systems, servers, elements, and/or components not otherwise shown or described herein. The NSSF 112 may be responsible for selecting or otherwise allocating a network slice available for providing a service requested by a UE, such as the UE 106 and/or UE 108 in the carrier network. The N3IWF interface 114 provides a gateway into the core network 102 for non-3GPP access to the core network 102 (e.g., access to the core network 102 not coming through a RAN). For example, the UE 108 may receive network connectivity from a component (e.g., a WiFi access point or hardwired local area network (LAN) device) which may not be under the control of MNO, does not (or at a time of the connectivity is not) connect to the core network via the cell site 104 (e.g., a RAN), and may access the core network 102 of the MNO via the N3IWF interface 114. In some examples, the N3IWF interface 114 may establish one or more secure connections in the core network 102, such as for providing control plane data and for providing user plane data in a secure manner.

The telemetry coordination manager 116, in some examples, coordinates between the UE 106 and the UE 108 to bind the UE 106 and the UE 108 together in a network slice. For example, as described above, conventional network slices may have one entry point into the core network 102, such as either the N3IWF interface 114 or the cell site (e.g., RAN) 104. However, for some application environments, such as described above herein, challenges may arise in end-to-end tracking or communication with assets, such as when the asset moves between 3GPP access to the core network 102 (e.g., a RAN) and non-3GPP access to the core network 102 (e.g., via a wireless router, satellite communication, hardwired network connection, or any other non-3GPP access method). For example, conventional network slicing may be unable to associate both the UE 106 accessing the core network via the cell site 105 and the UE 108 accessing the core network 102 via the N3IWF interface 114 to a same network slice, providing end-to-end insight into movements between the 3GPP access to the core network 102 and the non-3GPP access to the core network 102. To at least partially mitigate these challenges, the telemetry coordination manager 116 binds or otherwise associates the UE 106 and the UE 108 to a same network slice. In this way, an application server, application function, or other component allocated to the network slice may have access to data of, and communicate with, both the UE 106 and the UE 108. As a result, the application server, application function, or other component allocated to the network slice may have or obtain end-to-end knowledge of activities, assets, or other information irrespective of whether it originates at the UE 106 with 3GPP access to the core network 102 or the UE 108 with non-3GPP access to the core network 102.

Figure 2:
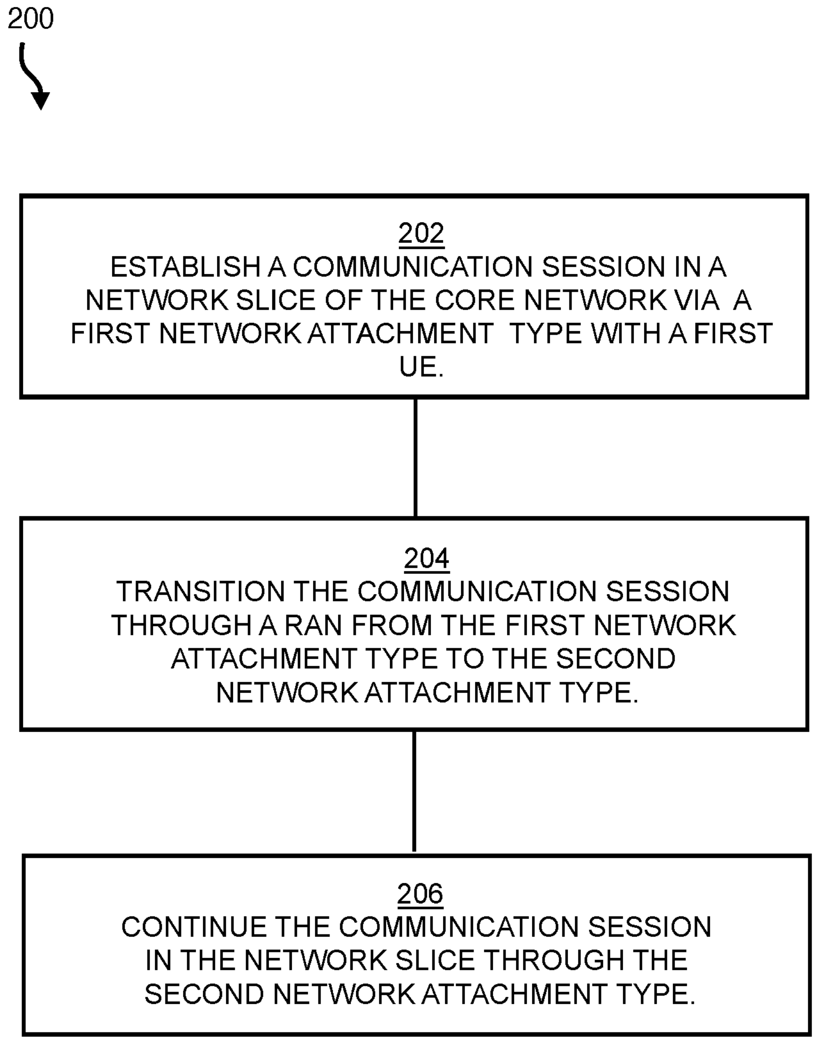
FIG. 2 is a flowchart of a method, in accordance with various examples.

Turning now to FIG. 2, a method 200 is shown, in accordance with various examples. Method 200 may be a method for binding multiple entry or access networks into a MNO core network, such as the core network 102, to a same network slice in the core network. Method 200 may be performed by the core network 102 in the communication system 100, such as at least in part by the telemetry coordination manager 116.

At operation 202, a communication session is established in a network slice of the core network via a first network attachment type with a first UE. In some examples, the first UE is one of the UE 106 or the UE 108, and the first network attachment type is one of 3GPP access (e.g., such as through a cell site 104 or other RAN) or non-3GPP access (e.g., such as through the N3IWF interface 114). In some examples, the first UE is in a static location, such as a warehouse, storage yard, retail location, manufacturing facility, or the like. For example, the first UE may be a reader, interrogator, or other device that tracks a location of assets in the static location and communicates with the core network via non-3GPP access. In other examples, the first UE is mobile, such as included in a semi-trailer truck, an airplane, a boat, or the like. For example, the first UE may be a reader, interrogator, or other device that tracks a location of assets in the static location and includes modem functionality such that the first UE communicates with the core network via 3GPP access. In yet other examples, the first UE may be a reader, interrogator, or other device that tracks a location of assets in the static location and communicates with the core network via non-3GPP access (e.g., such as via satellite-based communication, via non 3GPP terrestrial communication, near-field communication, or the like).

At operation 204, the communication session transitions through a RAN from the first network attachment type to the second network attachment type. For example, a second UE may depart a static location at which the first UE exists. In another example, the second UE may arrive at a static location at which the first UE exists. In some examples, transitioning through the RAN from the first network attachment type to the second network attachment type includes binding or otherwise associating both the first UE and the second UE, or both the first network attachment type and the second network attachment type, to the network slice. In some examples, the associating includes network slice coordination, such as interworking and interconnectivity among a first network coupled to the network core and network slice via the first network attachment type and a second network coupled to the network core and network slice via the second network attachment type.

At operation 206, the communication session continues in the network slice through the second network attachment type. In some examples, the communication session continues with the first UE. In other examples, the communication session continues with a second UE. In some examples, the second UE is one of the UE 106 or the UE 108, and the first network attachment type is one of 3GPP access (e.g., such as through a cell site 104 or other RAN) or non-3GPP access (e.g., such as through the N3IWF interface 114). In some examples, the second UE is in a static location, such as a warehouse, storage yard, retail location, manufacturing facility, or the like. For example, the second UE may be a reader, interrogator, or other device that tracks a location of assets in the static location and communicates with the core network via non-3GPP access. In other examples, the second UE is mobile, such as included in a semi-trailer truck, an airplane, a boat, or the like. For example, the second UE may be a reader, interrogator, or other device that tracks a location of assets in the static location and includes modem functionality such that the second UE communicates with the core network via 3GPP access. In yet other examples, the second UE may be a reader, interrogator, or other device that tracks a location of assets in the static location and communicates with the core network via non-3GPP access (e.g., such as via satellite-based communication, via non 3GPP terrestrial communication, near-field communication, or the like).

In some examples, the method 200 may include additional features and steps not shown in FIG. 2. In an example, the method 200 includes transitioning the communication session through the RAN from the second network attachment type back to the first network attachment type or to a third network attachment type. In some examples, after transitioning the communication session from the second network attachment type back to the first network attachment type or to the third network attachment type, communication session continues with the first UE or the second UE. In other examples, after transitioning the communication session from the second network attachment type back to the first network attachment type or to the third network attachment type, communication session continues with a third UE.

Figure 3A:
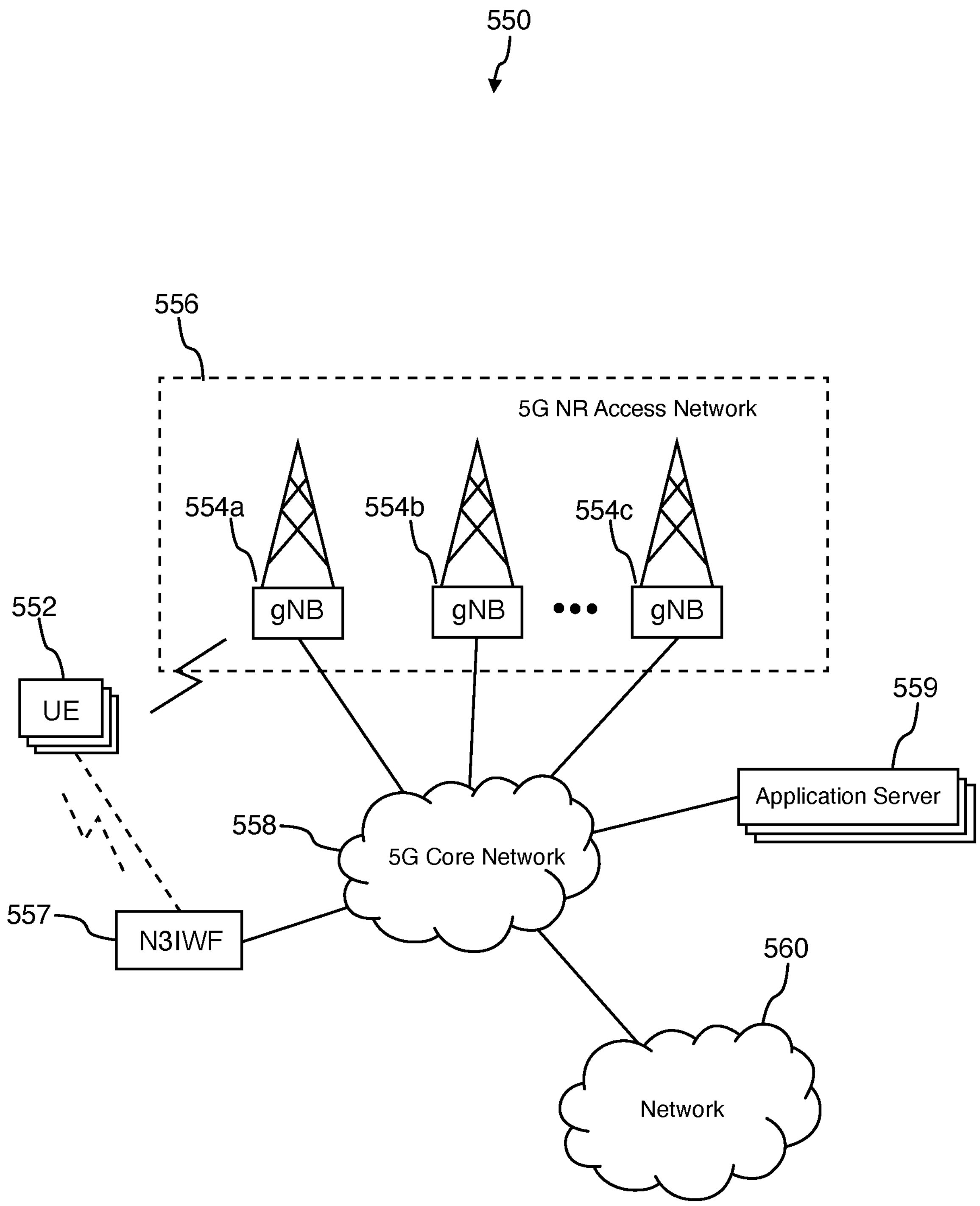
FIG. 3A and FIG. 3B are block diagrams of a 5G network, in accordance with various examples.

Turning now to FIG. 3A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly (e.g., modem) equipped communication devices (whether or not user operated), can operate. The access nodes 554 may be said to establish an access network 556. The access network 556 may be referred to as a RAN in some contexts. In a 5G technology generation an access node 554 may be referred to as a next Generation Node B (gNB). In 4G technology (e.g., long-term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations. Generally, the access network 556 provides 3GPP access to the core network 558.

In an embodiment, the access network 556 comprises a first access node 554*a*, a second access node 554*b*, and a third access node 554*c*. The access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long-Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing Internet service providers (ISPs) such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in RF spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

In some examples, UEs 552 communicate with the core network 558 via a network attachment type other than the access network 556. For example, a non-3GPP network attachment type. In such examples, the communication system 550 includes a N3IWF interface 557. The N3IWF interface 557 may operate as a gateway to facilitate access to the core network 558 by the UEs 552 without accessing the access network 556. In some examples, a UE may belong to both the UEs 552 and the UEs 552 (e.g., may connect to the core network 558 via the access network 556 at a first time and via the N3IWF interface 557 at a second time).

Figure 3B:
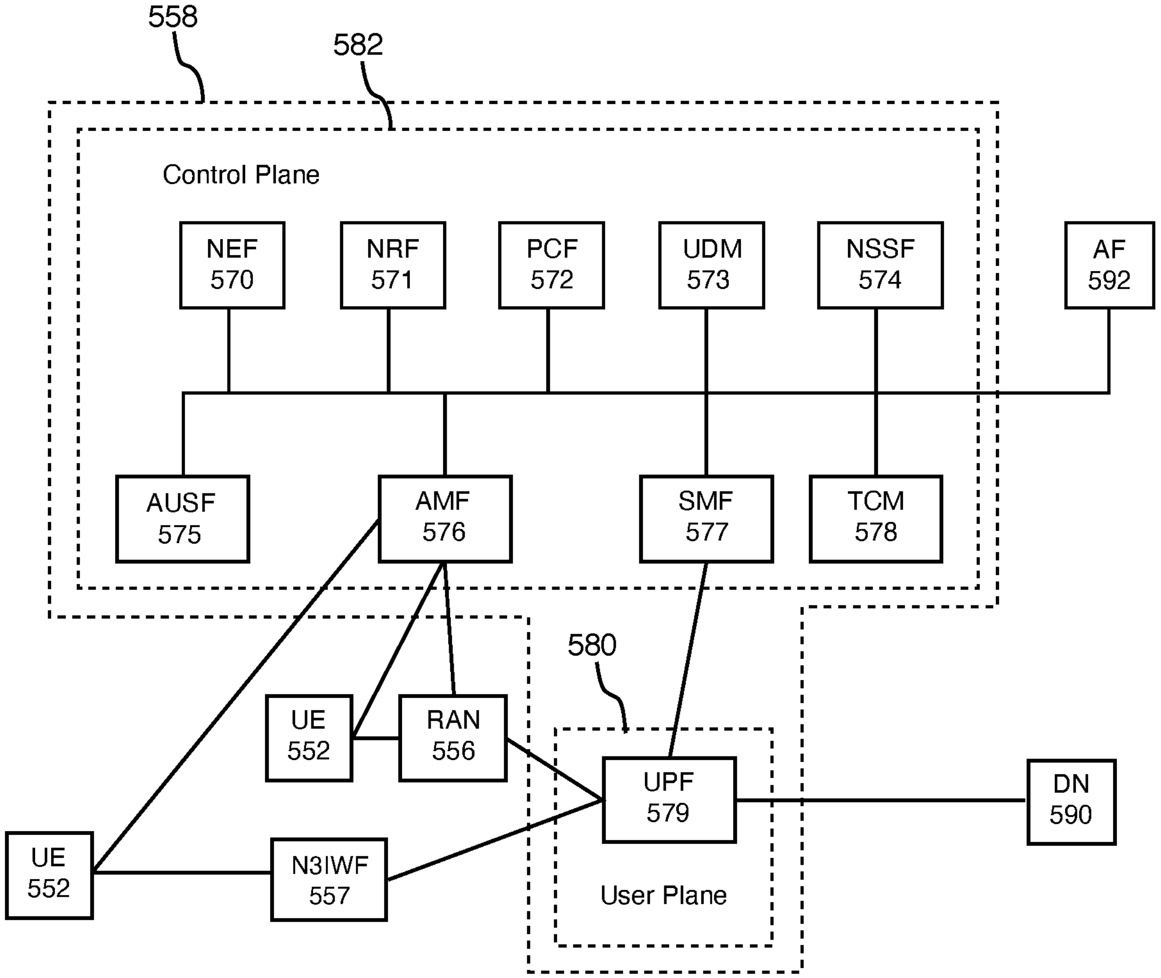

Turning now to FIG. 3B, further details of the core network 558 are described. In an embodiment, the core network 558 is a 5G core network. 5G core network technology is based on a service-based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a NSSF 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 shown in FIG. 3A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552. The TCM 578 may be the telemetry coordination manager 116, as described above.

Figure 4:
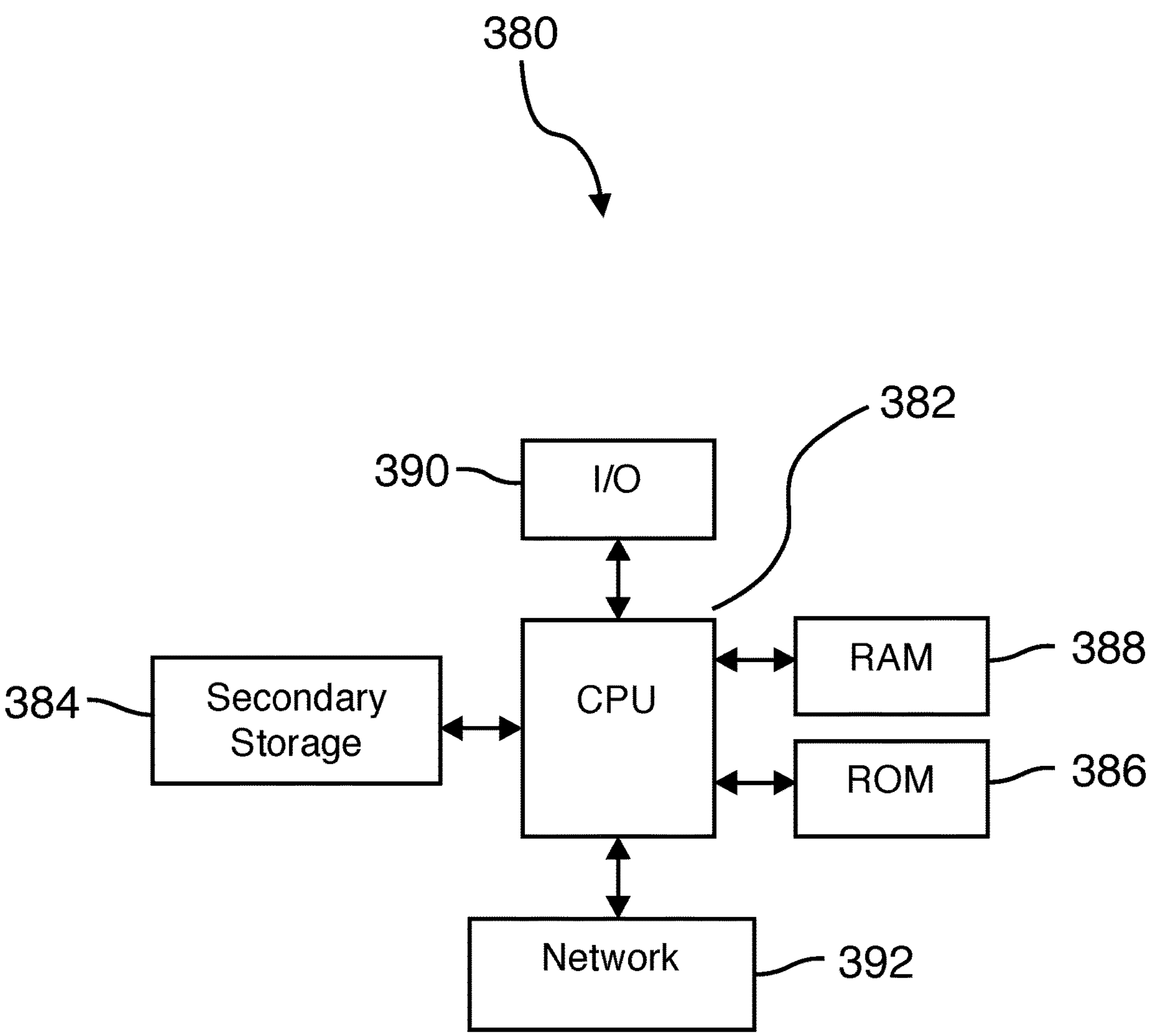
FIG. 4 is a block diagram of a computer system, in accordance with various examples.

FIG. 4 shows a computer system 380 suitable for implementing one or more examples described herein. For example, the computer system 380 may be suitable for implementation as the UE 106 and/or the UE 108. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

By programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and shown in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method, comprising:

establishing via a first communication device, a communication session in a network slice through a first network attachment type;

binding, by a telemetry coordination manager of a core network, the first network attachment type as a first entry to the network slice and a second network attachment type as a second entry to the network slice;

transitioning through a radio access network (RAN) from the first network attachment type to the second network attachment type; and continuing, via a second communication device, the communication session in the network slice through the second network attachment type simultaneously with the communication session in the network slice through the first network attachment type.

2. The method of claim 1, wherein the first network attachment type is a non-3rd Generation Partnership Project (3GPP) Inter-Working Function (N3IWF) network attachment type, and the second network attachment type is a 3rd Generation Partnership Project (3GPP) network attachment type.

3. The method of claim 1, wherein a destination of the network slice is an application function located outside of the core network, wherein the application function tracks activities of both the first communication device and the second communication device via the network slice.

4. The method of claim 1, wherein the communication session is established between a first user equipment and a core network via the first network attachment type.

5. The method of claim 4, wherein the communication session is continued between the first user equipment and the core network via the second network attachment type.

6. The method of claim 4, wherein the communication session is continued between a second user equipment and the core network via the second network attachment type.

7. A communication system, comprising:

a 3rd Generation Partnership Project (3GPP) network attachment interface;

a non-3GPP Inter-Working Function (N3IWF) network attachment interface; and a core network including a non-transitory memory including instructions for implementing a telemetry coordination manager, the telemetry coordination manager configured to:

bind the 3GPP network attachment interface and the N3IWF network attachment interface to a same network slice of the core network such that a communication session in the network slice is simultaneously maintainable through the 3GPP network attachment interface and through the N3IWF network attachment interface.

8. The communication system of claim 7, further comprising a first user equipment, wherein the first user equipment connects to the network slice via the non-3GPP network attachment interface at a first time.

9. The communication system of claim 8, wherein the first user equipment connects to the network slice via the 3GPP network attachment interface at a second time.

10. The communication system of claim 9, wherein the first user equipment connects to the network slice via the non-3GPP network attachment interface at a third time.

11. The communication system of claim 8, further comprising a second user equipment, wherein the second user equipment connects to the network slice via the 3GPP network attachment interface at a second time.

12. The communication system of claim 7, further comprising an application server, wherein the application is allocated to the network slice.

13. The communication system of claim 7, wherein the 3GPP network attachment interface is a radio access network (RAN).

14. A method, comprising:

requesting, by a first communication device, a first service of a core network, wherein the first communication device receives network connectivity via a first network attachment type, and wherein the first communication device is bound to a network slice;

communicating, by the first communication device, first data to the network slice in the core network via the first network attachment type;

requesting, by a second communication device, a second service of the core network, wherein the second communication device receives network connectivity via a second network attachment type simultaneously with the first communication device receiving network connectivity via the first network attachment type, wherein the first and second network attachment types are different, and wherein a telemetry coordination manager of the core network binds the second communication device to the network slice such that the first and second communication devices using different network attachment types are bound to the same network slice; and communicating, by the first communication device, second data to the network slice in the core network via the second network attachment type.

15. The method of claim 14, wherein the first and second communication devices are different communication devices.

16. The method of claim 14, wherein the first and second communication devices are a same communication device communicating via the different network attachment types at different times.

17. The method of claim 14, wherein the first network attachment type is a non-3rd Generation Partnership Project (3GPP) Inter-Working Function (N3IWF) network attachment interface, and wherein the second network attachment type is a 3rd Generation Partnership Project (3GPP) network attachment interface.

18. The method of claim 17, wherein the 3GPP network attachment interface is a radio access network (RAN).

19. The method of claim 14, wherein the first data is inventory data captured by an industrial, scientific, and medical (ISM) band system implemented in a static location, and wherein the second data is mobile telemetry data.

* * * * *